(12) United States Patent
Takeuchi (10) Patent No.: US 8,596,535 B2
(45) Date of Patent: Dec. 3, 2013

(54) NON-CONTACT INFORMATION PROCESSING DEVICE AND NON-CONTACT CARD MEDIUM ISSUING MACHINE

(75) Inventor: Junro Takeuchi, Nagano (JP)

(73) Assignee: Nidec Sankyo Corporation, Nagano (JP)

( * ) Notice: Subject to any disclaimer, the term of this patent is extended or adjusted under 35 U.S.C. 154(b) by 5 days.

(21) Appl. No.: 13/265,211

(22) PCT Filed: Apr. 19, 2010

(86) PCT No.: PCT/JP2010/002811
§ 371 (c)(1),
(2), (4) Date: Dec. 21, 2011

(87) PCT Pub. No.: WO2010/122763
PCT Pub. Date: Oct. 28, 2010

(65) Prior Publication Data
US 2012/0092786 A1    Apr. 19, 2012

(30) Foreign Application Priority Data

Apr. 21, 2009   (JP) ................................. 2009-102681

(51) Int. Cl.
*G06K 7/08*    (2006.01)
(52) U.S. Cl.
USPC ....................................................... 235/451
(58) Field of Classification Search
USPC ........................................................ 235/451
See application file for complete search history.

(56) References Cited

U.S. PATENT DOCUMENTS

| | | | |
|---|---|---|---|
| 6,508,399 B2 * | 1/2003 | Sasaki et al. | 235/381 |
| 7,740,174 B2 * | 6/2010 | Wakabayashi et al. | 235/451 |
| 2005/0218227 A1 * | 10/2005 | Takita et al. | 235/441 |

FOREIGN PATENT DOCUMENTS

| | | |
|---|---|---|
| JP | 2006-040037 | 2/2006 |
| JP | 2006-048455 | 2/2006 |
| JP | 2007-269485 | 10/2007 |
| JP | 2008-042452 | 2/2008 |
| JP | 2008-242519 | 10/2008 |

OTHER PUBLICATIONS

International Search Report for Application No. PCT/JP2010/002811 mailed Jul. 13, 2010.

* cited by examiner

*Primary Examiner* — Jamara Franklin
(74) *Attorney, Agent, or Firm* — Frommer Lawrence & Haug LLP (57) ABSTRACT

A non-contact information processing device and a non-contact card medium issuing machine that can easily and quickly judge whether an electromagnetic radiation function of a non-contact communication antenna is working properly or not. Concretely to describe, provided is a card reader that includes non-contact information processing for recording and/or reproducing information through electromagnetic induction without contacting a card medium; and a transfer path for transferring the card medium. The non-contact information processing has a device-side non-contact communication antenna that is able to send and receive information to/from a medium-side non-contact communication antenna provided on the card medium. Provided is detection for detecting if the device-side non-contact communication antenna is working normally. The detection has a control section, being independent of a control circuit for controlling the device-side non-contact communication antenna, and detects an electromagnetic wave generated from the device-side non-contact communication antenna.

6 Claims, 5 Drawing Sheets

NON-CONTACT INFORMATION PROCESSING DEVICE AND NON-CONTACT CARD MEDIUM ISSUING MACHINE

The present application claims priority from PCT Patent Application No. PCT/JP2010/002811 filed on Apr. 19, 2010, which claims priority from Japanese Patent Application No. JP 2009-102681 filed on Apr. 21, 2009, the disclosures of which is incorporated herein by reference in its entirety.

FIELD OF THE INVENTION

The present invention relates a non-contact information processing device and a non-contact card medium issuing machine for recording and/or reproducing information of various kinds of card media, such as a banking card, a credit card, and the like without contacting them.

DESCRIPTION OF RELATED ART

Conventionally used are a magnetic card on whose surface a magnetic stripe is formed, and an IC card in which an integrated circuit chip (an IC chip) is embedded, and on whose surface an IC terminal is placed, wherein these cards are used in financial institutions for the realization of cashless service, personal authentication, and so on. Also, becoming widespread is a non-contact IC card in which an RF (Radio Frequency) IC chip and a communication antenna (an antenna coil) are embedded, wherein information is sent and received through electromagnetic induction. Such a non-contact IC card has an advantage of being unaffected by contamination, abrasion, and the like of a surface of the card at the time of recording and/or reproducing information.

Information to/from a magnetic card and a contact IC card is recorded and/or reproduced by a magnetic card reader equipped with a magnetic head and an IC contact. In the meantime, information to/from a non-contact IC card is recorded and/or reproduced by a non-contact card reader equipped with a non-contact communication antenna. Then, a card issuing machine on which such a non-contact card reader is mounted is a non-contact card medium issuing machine that has a reading/writing function for non-contact IC cards. In such a non-contact card medium issuing machine, a non-contact IC card inserted through a gate hole is transferred by using a motor to a position where a non-contact communication antenna is placed, and information is sent and received through electromagnetic induction (by means of non-contact IC card communication). Then, after completion of the communication, the non-contact IC card is unloaded from the gate hole.

In such a communication method of sending and receiving information through electromagnetic induction, the communication is carried out via a magnetic field, and a state of the magnetic field cannot visually be checked under the condition. Accordingly, there are various kinds of technologies developed for judging whether a function of the non-contact communication antenna is working properly or not. For example, in some cases, a judgment is made in a section corresponding to a host portion (such as a higher-level device) by checking a presence of data of an actual communicating operation. In another case where a judgment is made solely by the non-contact card reader, a signal is sent from a non-contact control IC for controlling the function of the non-contact communication antenna through a predetermined circuit to a CPU port, while a judgment LED is separately mounted, and the judgment is made by checking an ON/OFF status of the judgment LED. Furthermore, developed in late years is another technology, in which the non-contact communication antenna is additionally equipped with its own IC tag for antenna inspection, and an ID code is exchanged between a non-contact control IC and the IC tag for antenna inspection in order to make a judgment on whether the non-contact communication antenna is working normally (for example, refer to Japanese Unexamined Patent Application Publication No. 2008-42452 ("JP 2008-42452")).

Unfortunately, by means of a conventional technology for judging whether a communicating function of a non-contact IC card is working or not by using a host portion, a main CPU, or an IC tag for antenna inspection, it is difficult to easily identify a failure of a non-contact communication antenna. Concretely to describe, in the case of making a judgment by using a host portion as described above, even when there is no data of an actual communicating operation, it is difficult for a maintenance personnel and the like to easily identify whether the trouble is due to a failure of a non-contact communication antenna, or a malfunction of a non-contact control IC or a main CPU. Similarly, in the case of making a judgment by using an ON/OFF status of a judgment LED as described above, when the judgment LED turns OFF, it is difficult for a maintenance personnel and the like to easily identify whether the trouble is due to a failure of a non-contact communication antenna, or a malfunction of a non-contact control IC. From this viewpoint, a judgment by using an IC tag for antenna inspection according to JP 2008-42452 mentioned above makes it possible to detect an error status of a non-contact communication antenna by means of exchanging an ID code. However, since an additional information process is required for exchanging the ID code, undeniable is a possibility that the detected error status of the non-contact communication antenna is due to an information processing error of the ID code. Thus, according to those conventional technologies, it is difficult to identify easily and quickly whether an electromagnetic radiation function of a non-contact communication antenna installed in a non-contact card reader is working properly or not.

SUMMARY OF THE INVENTION

It is an object of the present invention to provide a non-contact information processing device and a non-contact card medium issuing machine that make it possible to judge easily and quickly whether or not an electromagnetic radiation function of a non-contact communication antenna works properly.

To achieve the object described above, the present invention provides the following aspects.

(1) A non-contact information processing device including: non-contact information processing means for recording and/or reproducing information through electromagnetic induction without contacting a card medium; and a transfer path for transferring the card medium; wherein the non-contact information processing means has a device-side non-contact communication antenna that is able to send and receive information to/from a medium-side non-contact communication antenna provided on the card medium; detection means, which detects if the device-side non-contact communication antenna is working normally, is provided; and the detection means has a control section, being independent of a control circuit for controlling the device-side non-contact communication antenna, and detects an electromagnetic wave generated from the device-side non-contact communication antenna.

According to the present invention; the non-contact information processing device including the device-side non-contact communication antenna is provided with detection means that detects if the device-side non-contact communication antenna is working normally. The detection means has the control section, being independent of the control circuit for controlling the device-side non-contact communication antenna, and it can detect an electromagnetic wave generated from the device-side non-contact communication antenna. Therefore, it can be judged easily and quickly whether or not an electromagnetic wave radiation function of the non-contact communication antenna works properly.

More specifically, when the detection means can detect an electromagnetic wave radiated from the non-contact communication antenna, it can be recognized that the electromagnetic wave radiation function of the non-contact communication antenna is working properly. On the contrary, when the detection means cannot detect any electromagnetic wave, a maintenance personnel can quickly carry out maintenance work while paying attention to any trouble of the non-contact communication antenna. Thus, the present invention makes it possible to judge easily and quickly by using the detection means whether or not an electromagnetic wave is actually radiated from the non-contact communication antenna. Moreover, the detection means according to the present invention operates by means of the control section, being independent of the control circuit (for example, a non-contact control IC) for controlling the device-side non-contact communication antenna, and therefore it can fulfill an electromagnetic wave detection function, with no reference to any failure of the control circuit.

(2) The non-contact information processing device; wherein the detection means has an electromagnetic wave detection antenna for detecting an electromagnetic wave generated from the device-side non-contact communication antenna, and an electromagnetic wave detection LED for visually checking if the device-side non-contact communication antenna is working normally; and the control section is equipped with a rectifier circuit for rectifying a current obtained through the electromagnetic wave detection antenna, and supplying the rectified current to the electromagnetic wave detection LED.

According to the present invention; the detection means described above is provided with the electromagnetic wave detection antenna for detecting an electromagnetic wave, and the electromagnetic wave detection LED for visually checking if the device-side non-contact communication antenna is working normally; and the control section described above is equipped with the rectifier circuit for rectifying a current obtained through the electromagnetic wave detection antenna, and supplying the rectified current to the electromagnetic wave detection LED. Therefore, the electromagnetic wave detection LED can be supplied with electric power through the rectifier circuit. As a result, neither any external power supply nor a battery is needed for operating the detection means; and by using a simpler configuration, it can be judged whether or not the electromagnetic wave radiation function of the device-side non-contact communication antenna works properly. Moreover, since such an electromagnetic wave detection LED and a rectifier circuit can be purchased at low cost, this arrangement can also contribute to production cost savings.

(3) The non-contact information processing device; wherein the control section is equipped with a variable resistor for regulating the amount of current to be supplied to the electromagnetic wave detection LED.

According to the present invention; the control section described above is equipped with a variable resistor for regulating the amount of current to be supplied to the electromagnetic wave detection LED. Therefore, in addition to an original purpose of preventing an excessive current flow into the electromagnetic wave detection LED, the amount of current to be supplied can be changed variably according to the electromagnetic wave strength so that brightness of the electromagnetic wave detection LED can be controlled.

(4) The non-contact information processing device; wherein provided is a CPU checking LED for visually checking if a CPU for comprehensively controlling the whole of the non-contact information processing device is working properly; then, it is visually checked with the CPU checking LED if the CPU is working properly, and moreover it is visually checked with the electromagnetic wave detection LED if the device-side non-contact communication antenna is working normally.

According to the present invention; the non-contact information processing device is provided with the CPU checking LED for visually checking if the CPU (main CPU) for comprehensively controlling the whole device is working properly. Then, by means of the CPU checking LED and the above-described electromagnetic wave detection LED, it can be visually checked if the CPU and the device-side non-contact communication antenna are working properly. Therefore, a maintenance personnel can identify a defective spot further easily and quickly.

(5) The non-contact information processing device; wherein the detection means is installed at a position where is not formed an electromagnetic shield placed so as to surround at least a part of the device-side non-contact communication antenna.

According to the present invention; the detection means described above is installed at a position where is not formed the electromagnetic shield placed so as to surround at least a part of the device-side non-contact communication antenna. Therefore, it is possible to prevent a detection error from happening owing to turbulence of a magnetic flux due to presence of the electromagnetic shield.

(6) A non-contact card medium issuing machine including the non-contact information processing device; wherein the non-contact card medium issuing machine issues the card medium.

According to the present invention, provided can be the non-contact card medium issuing machine that makes it possible to judge easily and quickly whether or not the electromagnetic radiation function of the device-side non-contact communication antenna works properly.

According to the present invention described above, by detection means for detecting if a device-side non-contact communication antenna is working normally, it becomes possible to judge easily and quickly whether or not an electromagnetic wave radiation function of the device-side non-contact communication antenna works properly.

DETAILED DESCRIPTION OF EMBODIMENTS

It is to be understood that the figures and descriptions of the present invention have been simplified to illustrate elements that are relevant for a clear understanding of the present invention, while eliminating, for purposes of clarity, many other elements which are conventional in this art. Those of ordinary skill in the art will recognize that other elements are desirable for implementing the present invention. However, because such elements are well known in the art, and because they do not facilitate a better understanding of the present invention, a discussion of such elements is not provided herein.

The present invention will now be described in detail on the basis of exemplary embodiments.

Figure 1A:
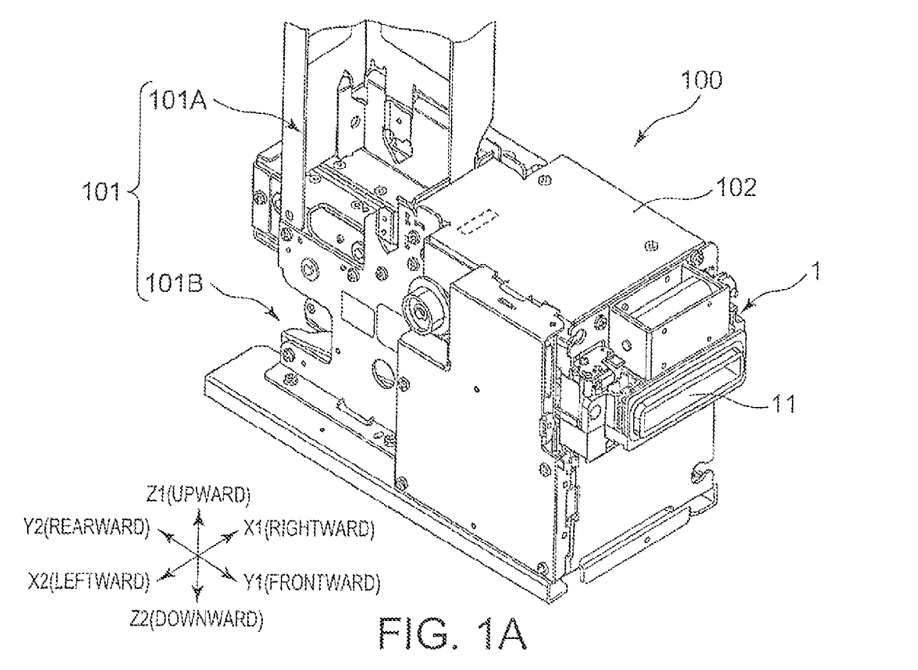
FIGS. 1(a) and 1(b) show a structure of a non-contact card issuing machine according to an embodiment of the present invention.
Figure 1B:
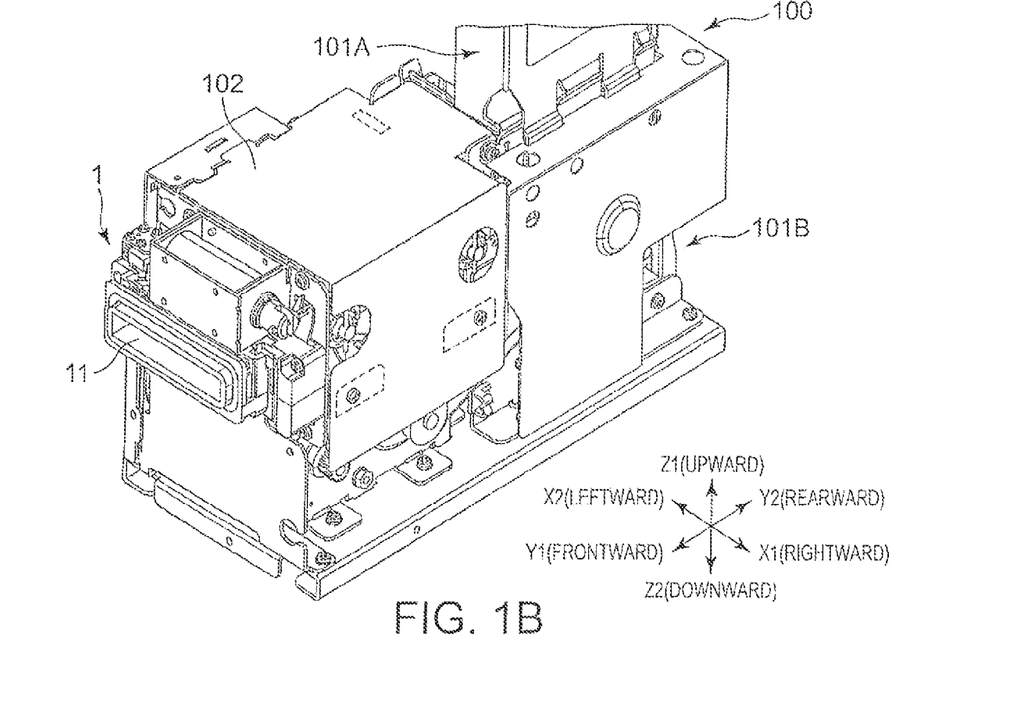
Figure 2A:
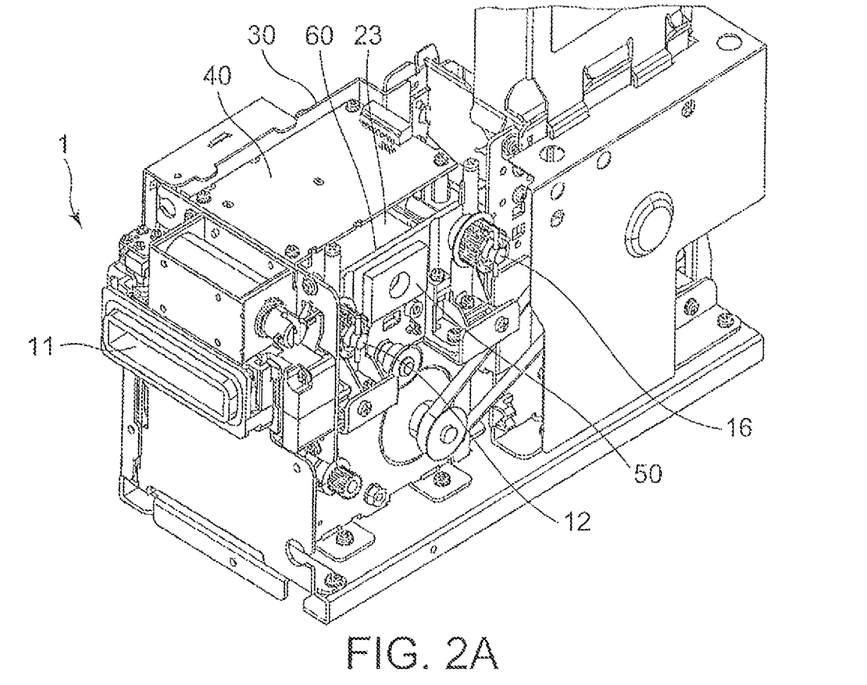
FIGS. 2(a) and 2(b) show conditions of the non-contact card issuing machine shown in FIG. 1(b), from which a cover for a chassis is removed.
Figure 2B:
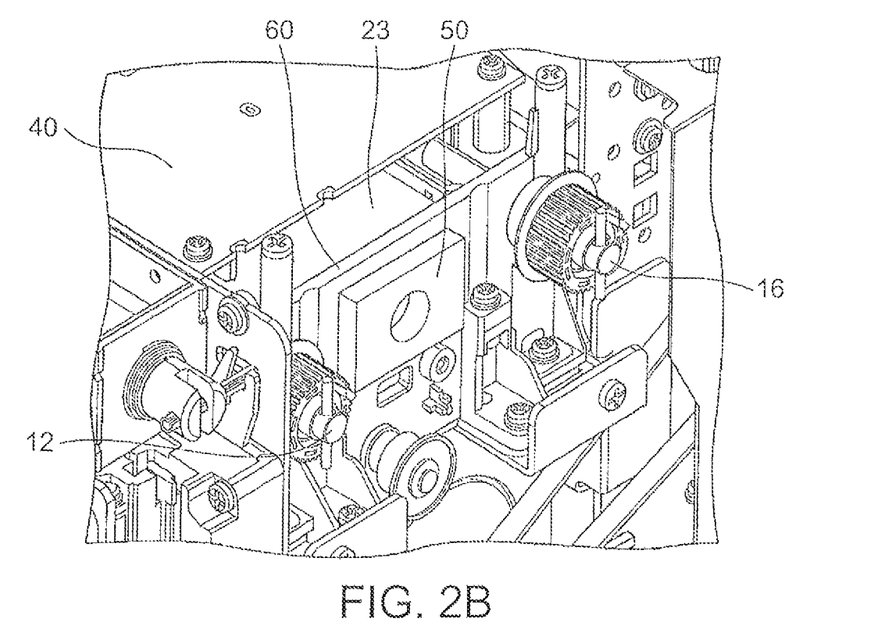
Figure 3A:
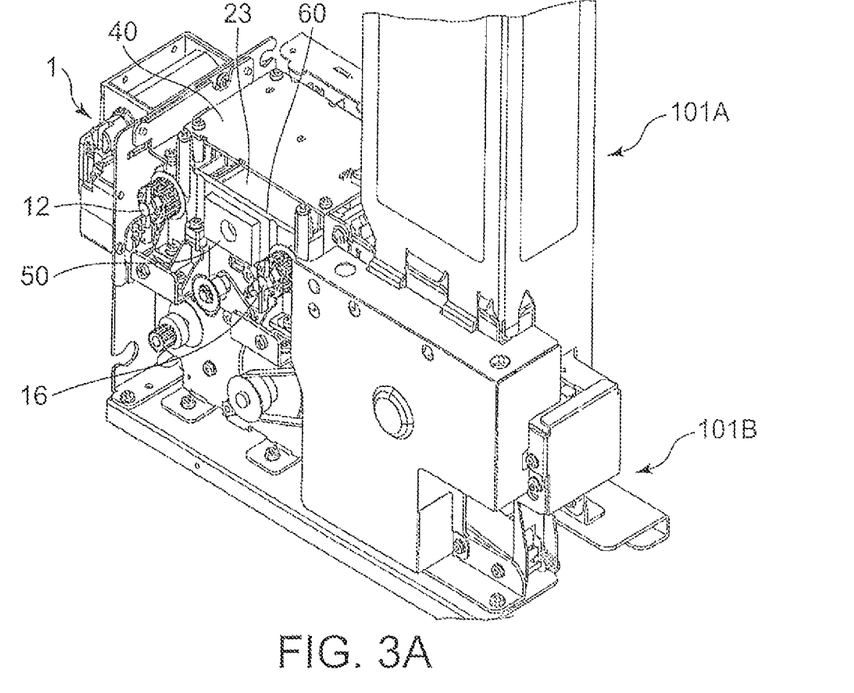
FIGS. 3(a) and 3(b) show conditions of the non-contact card issuing machine shown in FIG. 2(a), in a view from a right rear position.
Figure 3B:
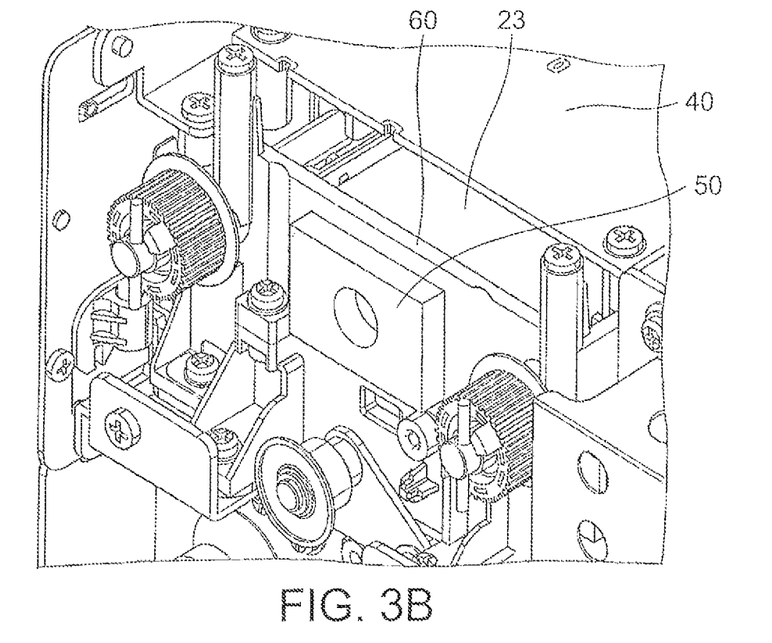

FIGS. 1(a) and 1(b) include drawings that show a structure of a non-contact card issuing machine 100 (an example of a non-contact card medium issuing machine) according to an embodiment of the present invention. Specifically, FIG. 1(a) is an external side view drawing of the non-contact card issuing machine 100, which shows a view from a left front position, while FIG. 1(b) is another external side view drawing of the non-contact card issuing machine 100, which shows a view from a right front position. FIG. 2(a) is a drawing that shows conditions of the non-contact card issuing machine 100 shown in FIG. 2(b), from which a cover 102 for a chassis is removed, while FIG. 2(b) is an enlarged view of a part of FIG. 2(a). In the meantime, FIG. 3(a) is a drawing that shows conditions of the non-contact card issuing machine 100 shown in FIG. 2(a), in a view from a right rear position, while FIG. 3(b) is an enlarged view of a part of FIG. 3(a). Being connected to a higher-level device (for example, such as an ATM (a host apparatus), and the like), a card reader 1 receives a command from the higher-level device, and sends a command execution result and so on to the higher-level device, through a predetermined interface. Being equipped with a magnetic head (not shown in the drawings) and a device-side non-contact communication antenna 23, the card reader 1 is a hybrid machine that can handle both a magnetic card and a non-contact IC card "C".

In the present explanation, as shown in FIGS. 1(a) and 1(b), three directions being at right angles to one another are called an X-direction, a Y-direction, and a Z-direction; and in the meantime, an X1-direction represents a rightward direction, and an X2-direction is a leftward direction; a Y1-direction represents a frontward direction, while a Y2-direction is a rearward direction; and a Z1-direction represents an upward direction, and a Z2-direction is a downward direction.

The non-contact card issuing machine 100 shown in FIG. 1(a) through FIG. 3(b) is provided with a function for issuing a card stored internally, and it is installed for use, for example, at a front desk of a hotel, a cash register of a convenience store, and the like. It is also provided with a function for collecting a needless card, a used card, a defective card, and so on.

The non-contact card issuing machine 100 includes the card reader 1 as an example of a non-contact information processing device, and a card issuing/collecting section 101 for issuing and collecting a card. The card reader 1 includes a card loading port 11 (which works as a card unloading port at the time of unloading a card), a transfer path through which a card is transferred in a rearward direction from the card loading port 11, a magnetic head which contacts with and slides on a magnetic stripe on a card for executing read/write operations (recording and/or reproducing information) with respect to the card, as well as the device-side non-contact communication antenna 23. Incidentally, placed under the card reader 1 is a circuit board 22 (refer to FIG. 4) on which a CPU and so on for controlling an entire section of the card reader 1 including the magnetic head are mounted. Furthermore, being not shown specifically in the drawings, but provided are an encoder for detecting an RPM of a driving motor, a position detection sensor for detecting an end part and so on of the card loaded into the card reader 1, and the like.

While contacting with and sliding on a magnetic stripe on a card surface, the magnetic head reads out magnetic data recorded in the magnetic stripe, and creates a reproduced signal according to the magnetic data. In the meantime, the device-side non-contact communication antenna 23 is able to send and receive information to/from a non-contact communication antenna provided to (embedded in) the card, and the device-side non-contact communication antenna 23 communicates with an IC chip embedded in the card by means of electromagnetic induction through the non-contact communication antenna. The device-side non-contact communication antenna 23 is located in the vicinity of and above the transfer path, and it is controlled by a non-contact control IC 40a mounted on a control board 40.

The card issuing/collecting section 101 has a card storage function for storing a plurality of cards that are stacked before issuance, and a card collecting function for collecting needless cards. Furthermore, the card issuing/collecting section 101 also has an unloading mechanism for delivering a stored card to the card reader 1 (not shown in the drawings). Concretely to describe, the card issuing/collecting section 101 includes a card storage section 101A for storing a plurality of cards that are stacked before issuance, and a card collecting compartment 101B for collecting needless cards.

At the time of issuing a card, at first the card unloading mechanism delivers a card, stored in the card issuing/collecting section 101, to the card reader 1. In the card reader 1, for example, predetermined information is recorded into the card. Then, the card into which information has been recorded is unloaded (issued) from the non-contact card issuing machine 100 via the card loading port 11.

In the case of a card, for example, which has been loaded into the non-contact card issuing machine 100, if it is judged that collecting the card is required as a result of information communication in the card reader 1, the card is unloaded from the card reader 1 to the card issuing/collecting section 101. The card unloaded from the card reader 1 is introduced to the card collecting compartment 101B by a guiding member, which is not shown in the drawings, so as to be collected there. Since the card collecting compartment 101B is located at a position lower than the card reader 1, the card unloaded from the card reader 1 drops by gravity into the card collecting compartment 101B.

The cover 102 shown in FIG. 1(b) is made of resin material, and removing the cover 102 results in the conditions shown in FIG. 2(a). As shown in FIG. 2(b) that is an enlarged view of a part of FIG. 2(a), rollers 12 and 16 are provided at a right side surface of the card reader 1, and placed between the rollers 12 and 16 is an electromagnetic wave detection circuit mounting plate 60 structured with resin material. The electromagnetic wave detection circuit mounting plate 60 is a plate component extending in each of frontward, rearward, upward, and downward directions (Y1-, Y2-, Z1-, and Z2-directions in FIGS. 1(a) and 1(b)), having its thickness in rightward and leftward directions (X1- and X2-directions in FIGS. 1(a) and 1(b)).

As shown in FIGS. 2(a) and 2(b), placed above the card reader 1 is the control board 40 on which the non-contact control IC 40a is mounted for controlling the device-side non-contact communication antenna 23. The device-side non-contact communication antenna 23 is so installed under the control board 40 as to be in parallel with a card to be loaded. Furthermore, as shown in FIG. 2(a), an electromagnetic shield 30 is so placed as to surround the device-side non-contact communication antenna 23. The electromagnetic shield 30 does not cover all circumferences of the device-side non-contact communication antenna 23. In the card reader 1, a front side, a left side, and a rear side of the device-side non-contact communication antenna 23 are covered with the electromagnetic shield 30. In other words, no electromagnetic shield is formed at a right side of the device-side non-contact communication antenna 23, and then the electromagnetic wave detection circuit mounting plate 60 described above is placed at the side.

In the card reader 1 according to the present invention, an electromagnetic wave detection circuit 50 is provided at a right side surface of the electromagnetic wave detection circuit mounting plate 60. The electromagnetic wave detection circuit 50 is a circuit that functions as an example of detection means for detecting if the device-side non-contact communication antenna 23 is working normally. A configuration of the circuit is described later. Incidentally, the electromagnetic wave detection circuit 50 shown in FIGS. 2(a) to 3(b) is described as a rectangular parallelepiped body having a bore in a rightward-leftward direction at around its center area in the drawings. However, the drawings just show a conceptual figure that indicates a mounting position for the component, and the shape and size of the component is not restricted (It may be round-shaped, and no bore may exist at around the center area). In the present embodiment, the electromagnetic wave detection circuit mounting plate 60 made of resin material, on which the electromagnetic wave detection circuit 50 is provided, is placed at a right-hand side of the device-side non-contact communication antenna 23. Alternatively, the electromagnetic wave detection circuit mounting plate 60 may be placed at any of a front side, a left-hand side, and a rear side of the device-side non-contact communication antenna 23. Externals of the card reader 1 are generally covered with a metal component; and in the meantime, making the electromagnetic wave detection circuit mounting plate 60 and the cover 102 with resin materials prevents the electromagnetic wave detection circuit 50 from changing its performance in electromagnetic induction. Furthermore, at a place where the electromagnetic shield 30 is not formed, only the electromagnetic wave detection circuit 50 may be installed (The electromagnetic wave detection circuit mounting plate 60 is not necessarily required).

Figure 4:
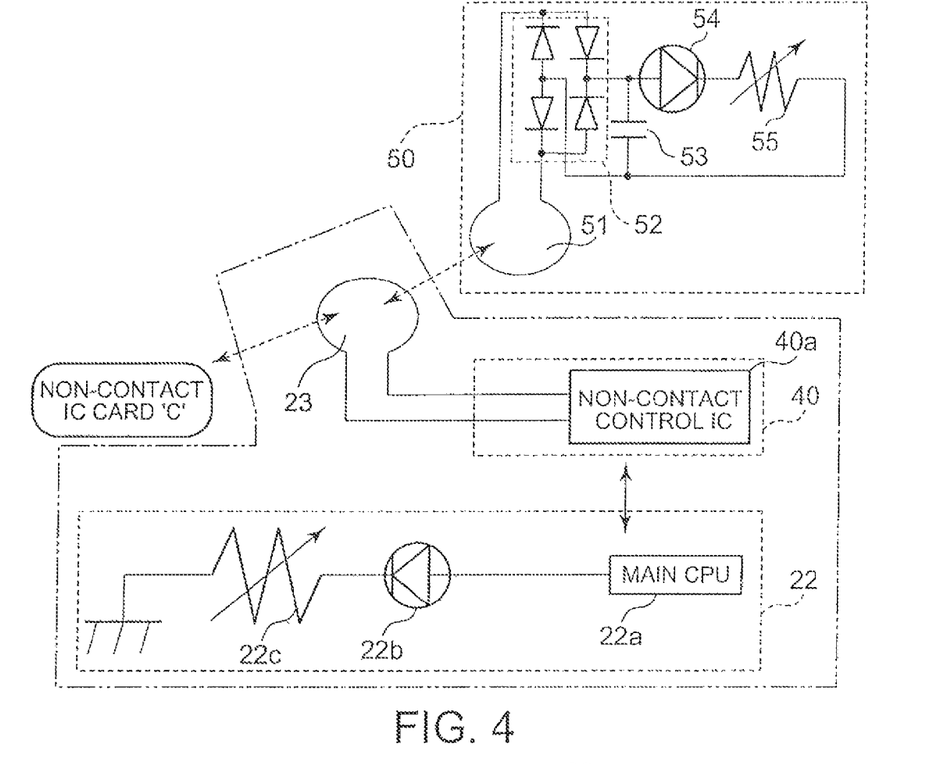
FIG. 4 is a block diagram showing an electrical configuration of a card reader.

FIG. 4 is a block diagram showing an electrical configuration of the card reader 1. In FIG. 4, the card reader 1 includes the circuit board 22 on which a main CPU 22a and so on for controlling the whole of the card reader 1 are mounted, and the control board 40 on which the non-contact control IC 40a is mounted. The circuit board 22 is provided with the main CPU 22a for comprehensively controlling the whole of the card reader 1, and a memory unit such as a ROM, a RAM, and the like that are not shown in the drawing. An LED 22b for an operation check on the circuit board 22 is connected to the main CPU 22a, and thus it can be checked visually if the main CPU 22a is working normally. The LED 22b functions as an example of a CPU checking LED, and it is grounded through a variable resistor 22c. In the meantime, the device-side non-contact communication antenna 23 is electrically connected to the control board 40 for making it possible to send and receive information to/from the non-contact IC card "C". Meanwhile, the non-contact control IC 40a mounted on the control board 40 controls the device-side non-contact communication antenna 23 according to a command coming from the main CPU 22a.

In the card reader 1 of the present embodiment, the electromagnetic wave detection circuit mounting plate 60 made of resin material, which is provided with the electromagnetic wave detection circuit 50, is placed in the vicinity of the device-side non-contact communication antenna 23, as described above (refer to FIG. 2(b)). The electromagnetic wave detection circuit 50 includes an electromagnetic wave detection antenna 51 for detecting an electromagnetic wave (refer to a dotted arrow line shown in the drawing) generated from the device-side non-contact communication antenna 23, and an LED 54 for visually checking if the device-side non-contact communication antenna 23 is working normally, wherein the LED 54 functions as an example of an electromagnetic wave detection LED. Moreover, in the present embodiment, the electromagnetic wave detection circuit 50 also includes a rectifier circuit 52, a capacitor 53, and a variable resistor 55. The rectifier circuit 52 has a rectifier function for rectifying an inductive current obtained by the electromagnetic wave detection antenna 51 and supplying the current to the LED 54, and meanwhile the capacitor 53 has a function for controlling ripples in the rectified current and smoothing a pulse-like current (Sometimes a signal source from the non-contact control IC 40a contains a pulse source). In the meantime, the variable resistor 55 has a function for preventing an excessive current to the LED 54, and it also has a function for regulating the amount of current to be supplied to the LED 54 so as to control brightness of the electromagnetic wave detection 1 LED, through variably changing the amount of current supply according to the electromagnetic wave strength. Incidentally, as shown with the dotted lines in FIG. 4, the electromagnetic wave detection circuit 50 is electrically independent of the main CPU 22a, the non-contact control IC 40a, and so on. Then, the electromagnetic wave detection antenna 51, the rectifier circuit 52, the capacitor 53, and the variable resistor 55 function together as an example of a "control section" that controls the LED 54.

In the case of the card reader 1 including the LED 22b and the LED 54 as shown in FIG. 4, it can be checked visually by using the LED 22b if the main CPU 22a is working normally, meanwhile it can be checked visually by using the LED 54 if the device-side non-contact communication antenna 23 is working normally. Thus, based on the premise that the main CPU 22a is working normally, a maintenance personnel can identify a defective spot further easily and quickly through monitoring whether or not the device-side non-contact communication antenna 23 is properly demonstrating its electromagnetic wave radiation function, and whether or not the non-contact control IC 40a is properly working, by means of the LED 54.

Figure 5:
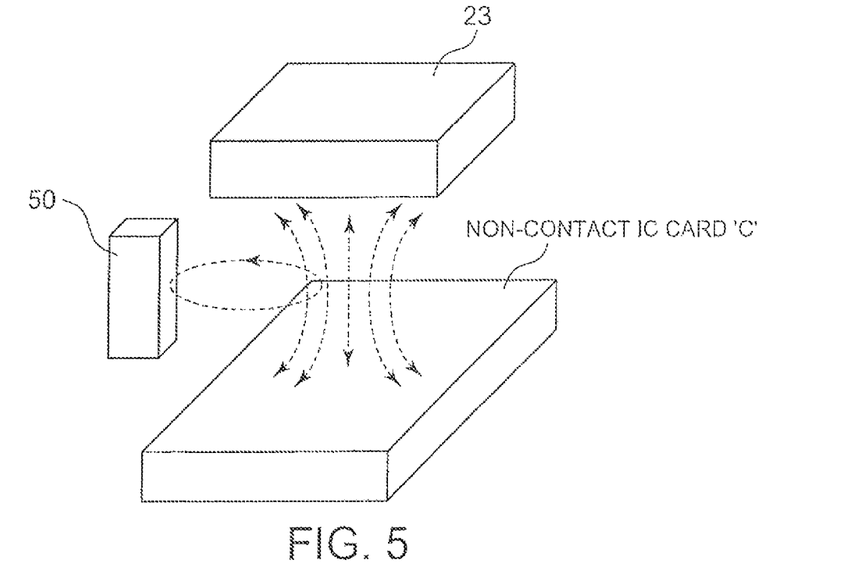
FIG. 5 is a conceptual diagram showing how an electromagnetic wave detection circuit detects an electromagnetic wave from a device-side non-contact communication antenna.

FIG. 5 is a conceptual diagram showing how the electromagnetic wave detection circuit 50 detects an electromagnetic wave from the device-side non-contact communication antenna 23.

In FIG. 5, the card reader 1 performs communication with the non-contact IC card "C" by using a magnetic wave flux (dotted arrow lines shown in the drawing) generated from the device-side non-contact communication antenna 23. The operation is based on the electromagnetic induction method, and a directional property of the magnetic wave flux depends on an inductance factor. Therefore, the directional property of the magnetic wave flux can be changed intentionally. In the present embodiment, the device-side non-contact communication antenna 23 is postured to be face-to-face with the non-contact IC card "C", and meanwhile it is placed at a right angle to a substrate board (the electromagnetic wave detection antenna 51) of the electromagnetic wave detection circuit 50. The magnetic wave flux generated from the device-side non-contact communication antenna 23 has a higher intensity at a position closer to a center area. Therefore, the closer to the center area a position is, the easier it becomes to obtain the magnetic wave flux at the position. Accordingly, for obtaining the magnetic wave flux at a position closer to the center area, and for easy installation work, the substrate board of the electromagnetic wave detection circuit 50 is placed at a position such as shown in FIG. 5, (around at an intermediate position between the device-side non-contact communication antenna 23 and the non-contact IC card "C"). Thus, a voltage for operation of the LED 54 can be obtained, though a directional property of the magnetic wave flux is different from that in the communication with the non-contact IC card "C".

Figure 6:
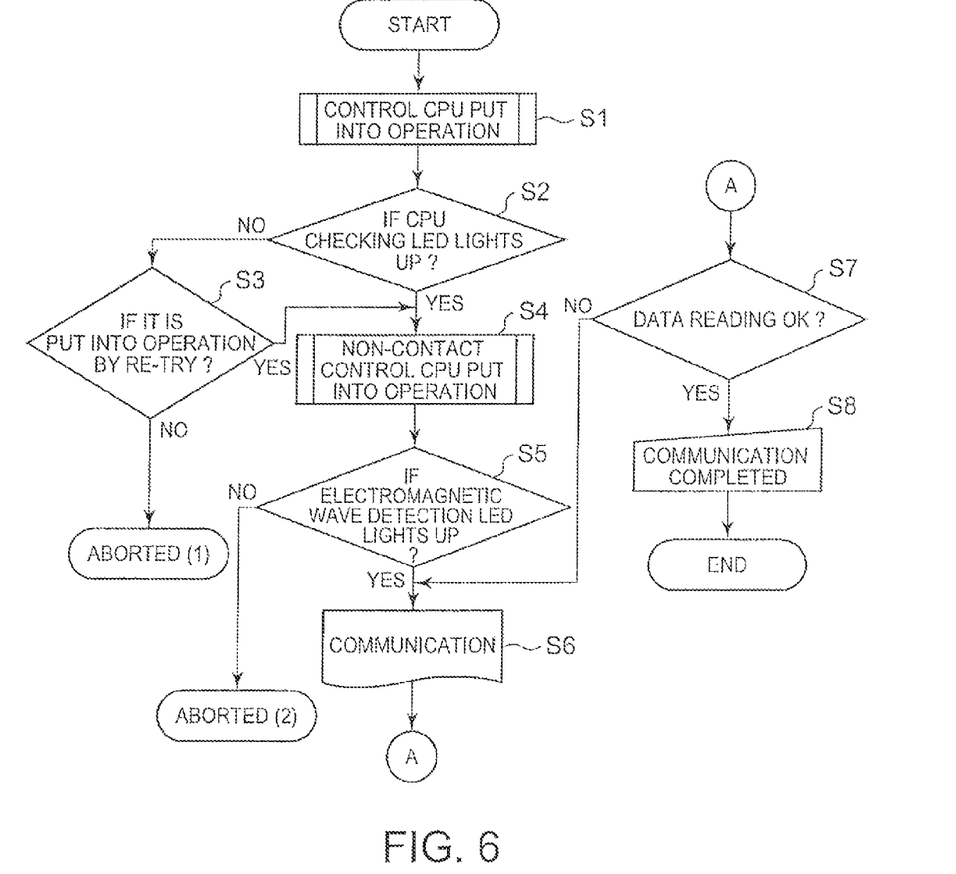
FIG. 6 is a flowchart showing a workflow of recognizing operation in communication with a non-contact IC card in a card reader according to the present embodiment.

FIG. 6 is a flowchart showing a workflow of recognizing operation in communication with the non-contact IC card "C" in the card reader 1 according to the present embodiment. In the present embodiment, the card reader 1 is so controlled as to operate the device-side non-contact communication antenna 23 when the non-contact IC card "C" arrives at a predetermined position in the transfer path of the card reader 1. In the case where the device-side non-contact communication antenna 23 is always kept in operation, it becomes possible to carry out communication even when the non-contact IC card "C" is on its way to the predetermined position, and sometimes the communication may actually be carried out. In such a case, since the non-contact IC card "C" is in the middle of traveling motion, the communication is carried out under uncertain condition so that an error is likely to be caused easily. To avoid such uncertain condition, after the non-contact IC card "C" stops at the predetermined position, the device-side non-contact communication antenna 23 starts its operation to communicate with the non-contact IC card "C", as described above. Moreover, dealing with operation in this way enables savings in costs and so forth.

In FIG. 6, the main CPU 22a (described as "CONTROL CPU" in the drawing) is put into operation (Step S1). Then, a maintenance personnel and the like make a judgment on whether the LED 22b (described as "CPU CHECKING LED" in the drawing) lights up or not according to a command of a signal source output from the main CPU 22a (Step S2). When the LED 22b does not light up, it is supposed that there may exist a problem in hardware or an error in interface. In such a case, the operation is retried, and it is checked whether the main CPU 22a is put into operation or not (Step S3). If the LED 22b does still not light up (Step S3: NO), it is considered that control is disabled and the operation is aborted ("ABORTED (1)").

On the other hand, if the LED 22b lights up in Step S2 (Step S2: YES), or if the main CPU 22a is put into operation as a result of retrying operation so as to light up the LED 22b (Step S3: YES), a CPU included in the non-contact control IC 40a (described as "NON-CONTACT CONTROL CPU" in the drawing) is put into operation (Step S4). Incidentally, the non-contact control CPU is a power output CPU, and it has a function for communication with the non-contact IC card "C". Then, a maintenance personnel and the like make a judgment about operation of the non-contact control CPU, namely about whether the LED 54 lights up or not (Step S5).

When the LED 54 does not light up (Step S5: NO), it is supposed that; the device-side non-contact communication antenna 23 has a failure (incorrect wiring), or the non-contact control IC 40a has a failure (Improper power is output from the non-contact control IC 40a, the power is insufficient, and so on); and accordingly the operation is aborted ("ABORTED (2)").

On the other hand, if the LED 54 lights up in Step S5 (Step S5: YES), it is recognized that; proper power is output from the non-contact control IC 40a, and the device-side non-contact communication antenna 23 is properly demonstrating its electromagnetic wave radiation function; and therefore the communication with the non-contact IC card "C" gets started (Step S6). Then, it is judged whether or not reading operation has been done (Step S7). If data reading out of the non-contact IC card "C" has not been done (Step S7: NO), operation returns to Step S6 for retrying the communication. On the other hand, if data reading out of the non-contact IC card "C" has successfully been completed (Step S7: YES), it is supposed that the communication has been completed (Step S8) and the operation ends.

If data reading out of the non-contact IC card "C" cannot be done even after retrying Step S6 and Step S7 multiple times, it is judged that, for example, the card is defective. Then, the non-contact IC card "C" is unloaded through the card loading port.

ADVANTAGEOUS EFFECT OF THE EMBODIMENT

As described above; using the non-contact card issuing machine 100 and the card reader 1 according to the present embodiment, a maintenance personnel can quickly carry out maintenance work while paying attention to any trouble of the device-side non-contact communication antenna 23 and any failure of the non-contact control IC by means of visually checking whether the LED 54 functioning as an example of an electromagnetic wave detection LED lights up or not (Step S5 in FIG. 6). Moreover, since the LED 54 works being independent of the control board 40 as shown in FIG. 4, it can fulfill an electromagnetic wave detection function, putting aside any failure of the non-contact control IC 40a of the control board 40 (For example, identified can be even such a failure that no electromagnetic wave is generated from the device-side non-contact communication antenna 23 while the non-contact control IC 40a is properly operating).

Furthermore, as the block diagram of FIG. 4 shows, the electromagnetic wave detection circuit 50 does not need to have any external power supply or a battery. Therefore, by using a simpler configuration, it can be judged whether or not the electromagnetic wave radiation function of the device-side non-contact communication antenna 23 works properly. Furthermore, locating the LED 54 at a position in the machine, where the LED 54 can easily be seen, enables a maintenance personnel to easily check the operation of the LED 54, and it also becomes possible to recognize magnetic field strength according to light source intensity of the LED 54.

Moreover, as Step S2 and Step S5 show in FIG. 6, making use of the LED 22b as a CPU checking LED and the LED 54 as an electromagnetic wave detection LED, it can be checked visually if the main CPU 22a and device-side non-contact communication antenna 23 are working normally. Therefore, a maintenance personnel can identify a defective spot further easily and quickly (so as to lead to early identification of a defective spot).

INDUSTRIAL APPLICABILITY

As described above, the present invention is useful for judging easily and quickly whether the electromagnetic wave radiation function of a device-side non-contact communication antenna of a card reader works properly or not.

While this invention has been described in conjunction with the specific embodiments outlined above, it is evident that many alternatives, modifications, and variations will be apparent to those skilled in the art. Accordingly, the preferred embodiments of the invention as set forth above are intended to be illustrative, not limiting. Various changes may be made without departing from the spirit and scope of the inventions as defined in the following claims.

REFERENCE NUMERALS

1. Card reader
11. Card loading port
12 & 16. Rollers
22. Circuit board
22a. Main CPU
22b. (CPU checking) LED
23. Device-side non-contact communication antenna
50. Electromagnetic wave detection circuit
51. Electromagnetic wave detection antenna
52. Rectifier circuit
53. Capacitor
54. (Electromagnetic wave detection) LED
55. Variable resistor

What is claimed is:

1. A non-contact information processing device comprising:
    non-contact information processing means for recording, reproducing, or recording and reproducing information through electromagnetic induction without contacting a card medium; and
    a transfer path for transferring the card medium;
    wherein the non-contact information processing means has a device-side non-contact communication antenna that is configured to send information to and receive information from a medium-side non-contact communication antenna provided on the card medium;
    wherein the non-contact information processing device further includes a detection means, which detects if the device-side non-contact communication antenna is working normally, and which detects an electromagnetic wave generated from the device-side non-contact communication antenna; and
    wherein the detection means has a control section which is independent of a control circuit for controlling the device-side non-contact communication antenna.

2. The non-contact information processing device according to claim 1;
    wherein the detection means includes:
        an electromagnetic wave detection antenna for detecting an electromagnetic wave generated from the device-side non-contact communication antenna; and
        an electromagnetic wave detection LED for visually checking if the device-side non-contact communication antenna is working normally; and
    wherein the control section is equipped with a rectifier circuit, for rectifying a current obtained through the electromagnetic wave detection antenna, and for supplying the rectified current to the electromagnetic wave detection LED.

3. The non-contact information processing device according to claim 2;
    wherein the control section is equipped with a variable resistor for regulating the amount of current to be supplied to the electromagnetic wave detection LED.

4. The non-contact information processing device according to claim 1, further comprising:
    a CPU checking LED for visually checking if a CPU, for comprehensively controlling the whole of the non-contact information processing device, is working properly; and
    wherein the electromagnetic wave detection LED is configured to be visually checked to determine if the device-side non-contact communication antenna is working normally.

5. The non-contact information processing device according to claim 1;
    wherein the detection means is installed at a position, where there is no electromagnetic shield, so as to surround at least a part of the device-side non-contact communication antenna.

6. A non-contact card medium issuing machine comprising:
    a non-contact information processing device comprising:
        non-contact information processing means for recording, reproducing, or recording and reproducing information through electromagnetic induction without contacting a card medium; and
        a transfer path for transferring the card medium;
        wherein the non-contact information processing means has a device-side non-contact communication antenna that is configured to send information to and receive information from a medium-side non-contact communication antenna provided on the card medium;
        wherein the non-contact information processing de ice further includes a detection means, which detects if the device-side non-contact communication antenna is working normally, and which detects an electromagnetic wave generated from the device-side non-contact communication antenna; and
        wherein the detection means has a control section which is independent of a control circuit for controlling the device-side non-contact communication antenna;
    wherein the non-contact card medium issuing machine issues the card medium.

* * * * *